United States Patent

[11] 3,614,038

| [72] | Inventor | Gerald L. Nichols<br>Farmington, Mich. |
|------|----------|---------------------------------|
| [21] | Appl. No. | 1,421 |
| [22] | Filed | Jan. 8, 1970 |
| [45] | Patented | Oct. 19, 1971 |
| [73] | Assignee | Ace Filtercraft, Inc.<br>Farmington, Mich. |

[54] POROUS METAL PANEL TO DISTRIBUTE DEICING FLUID ONTO THE LEADING EDGE OF A SURFACE
7 Claims, 7 Drawing Figs.

| [52] | U.S. Cl. | 244/134 C |
| [51] | Int. Cl. | B64d 15/08 |
| [50] | Field of Search | 244/134 C, 134 E |

[56] References Cited
UNITED STATES PATENTS

| 2,075,659 | 3/1937 | Ramsbottom et al. | 244/134 C |
| 2,249,940 | 7/1941 | Bulloch | 244/134 C |
| 2,422,746 | 6/1947 | Patterson | 244/134 C |
| 2,433,214 | 12/1947 | Halbert et al. | 244/134 C |
| 2,457,031 | 12/1948 | Campbell et al. | 244/134 C |

*Primary Examiner*—Allen B. Curtis
*Attorney*—Donnelly, Mentag & Harrington

ABSTRACT: A porous metal panel for use in distributing deicing fluid onto the leading edge of a surface, such as the wings and tail of an airplane or other vehicle, that requires protection against ice. The porous metal panel includes a porous outer metal plate, a nonporous inner metal plate, a porous metal membrane having a porosity finer than the porosity of said porous outer plate disposed on the inner surface of said porous outer plate, a separator member comprising a sheet of metal wire mesh disposed between said metal membrane and said inner nonporous metal plate, said separator member having a porosity coarser than the porosity of said porous metal membrane, the peripheral edges of said inner plate and membrane being bonded in a fluidtight condition to the outer plate to enclose said separator member and form a fluid chamber, and means for connecting said fluid chamber to a source of pressurized deicing fluid for admission of said fluid into said chamber for distribution through said membrane and outer porous plate onto said surface.

PATENTED OCT 19 1971
3,614,038
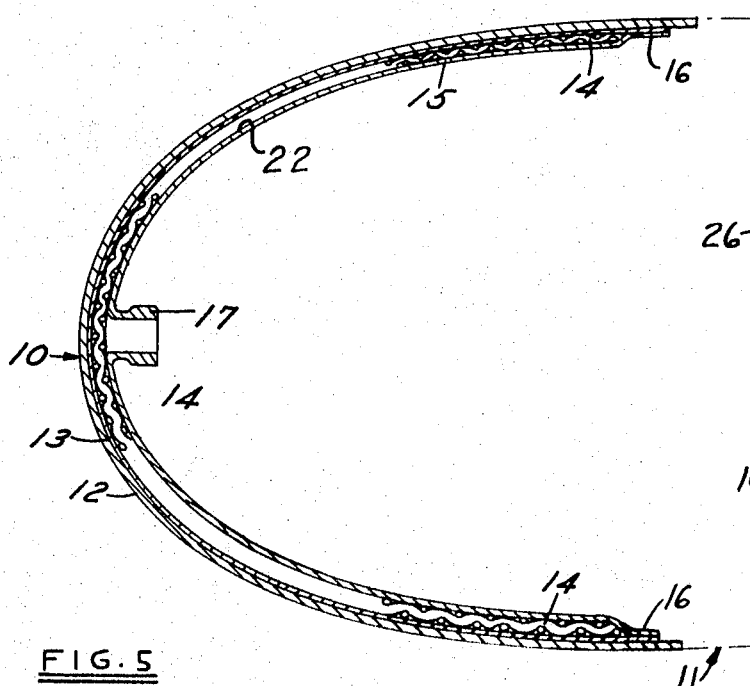
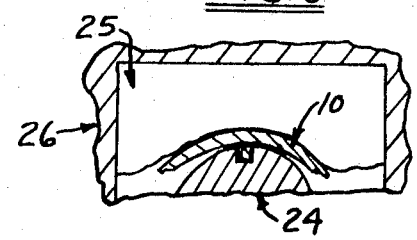
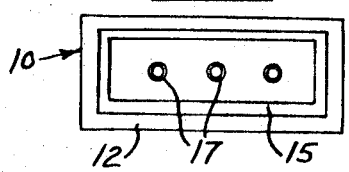
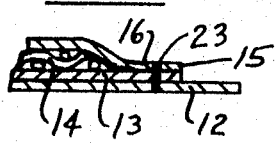
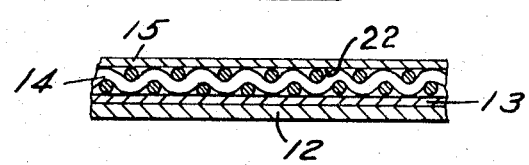
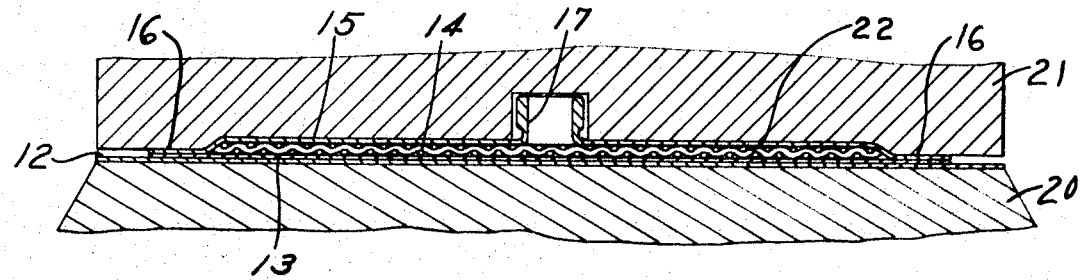
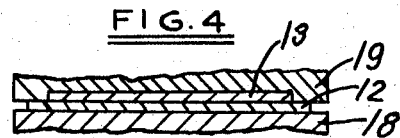
INVENTOR
GERALD L. NICHOLS
BY
Donnelly, Mentag & Harrington
ATTORNEYS

POROUS METAL PANEL TO DISTRIBUTE DEICING FLUID ONTO THE LEADING EDGE OF A SURFACE

SUMMARY OF THE INVENTION

This invention relates generally to deicing apparatus, and more particularly, to a porous metal panel for use in distributing deicing fluid onto the leading edge of a surface, such as the wings and tail of an airplane or other vehicle that requires protection against ice.

Heretofore, porous panels have been provided for incorporation into surfaces to distribute deicing fluid onto the leading edge of such surfaces. The surface may be the surface of a wing, tail or other surface of an airplane, or a surface of some other vehicle that requires protection against ice. The prior art porous panels had many disadvantages For example, the prior art panels had an outer porous plate and a hollow chamber formed behind said outer plate. A disadvantage of such prior art panels is that they were not of a strong, solid pack construction, and incorporated a plastic material or nonmetallic filter type of material for the membrane. The various parts of the prior art panels were secured together by fasteners, such as rivets, and seal members were needed to provide fluidtight conditions. Such a construction provided for intermittent connection between the various parts of the panel and not a continuous joining of the members. Such prior art panels were not of all similar metal parts and included along with the plastic membrane, an outer plate of aluminum, plastic or other material for the membrane, seals, and fillers.

In view of the foregoing, it is an important object to provide a novel and improved porous metal panel for distributing deicing fluid over the leading edge of a surface which is adapted to overcome the aforementioned disadvantages of the prior art porous panels.

It is another object of the present invention to provide a porous metal panel for distributing deicing fluid over the leading edge of a surface that requires protection against ice and which is formed entirely from metal components that are bonded together by heat and pressure so as to form a solid pack construction which provides a stronger porous panel than was available in the prior art constructions.

It is still another object of the present invention to provide a novel and improved porous metal panel for distributing deicing fluid over the leading edge of a surface which is simple and compact in construction, economical to manufacture and efficient in use.

It is another object of the present invention to provide a novel and improved porous metal panel for distributing deicing fluid onto the leading edge of a surface which requires protection against ice and which includes, a porous outer metal plate, a nonporous inner metal plate, a porous metal membrane having a porosity finer than the porosity of said porous outer plate disposed on the inner surface of said outer plate, a separator member comprising a sheet of metal wire mesh disposed between said metal membrane and said nonporous metal plate, said separator member having a porosity coarser than the porosity of said porous metal membrane, the entire peripheral edges of said inner plate and membrane being continuously bonded in a fluidtight condition to the outer plate to enclose said separator member and form a fluid chamber, and means for connecting said fluid chamber to a source of pressurized deicing fluid for admission of said fluid into said chamber for distribution through said membrane and outer porous plate onto said surface. Said outer plate, inner plate, membrane and separator member are preferably formed from stainless steel, and bonded together by heat and pressure. Said peripheral edges may also be electron beam welded.

Other features and advantages of this invention will be apparent from the following detailed description, appended claims, and the accompanying drawing.

BRIEF DESCRIPTION OF THE DRAWING

FIG. 1 is an elevational section view of a porous metal panel for distributing deicing fluid onto a surface and made in accordance with the principles of the present invention.

FIG. 2 illustrates the metallurgical bonding of the various components of the porous metal panel of the present invention by heat and pressure.

FIG. 3 is a fragmentary, enlarged, elevational section view of the porous metal panel of FIG. 1, and showing the various metal components in an enlarged form.

FIG. 4 is a schematic view of a subassembly step in the method of making the porous metal panel of the present invention, and showing the method of assembling by heat and pressure a stainless steel membrane to a porous stainless steel outer plate.

FIG. 5 is a fragmentary, elevational view of an end portion of a porous metal panel made in accordance with the principles of the present invention, and showing the peripheral edges of the various components of the panel fastened together by being electron beam welded together.

FIG. 6 is a schematic illustration of one method for shaping the porous metal panel of the present invention.

FIG. 7 is an inside plan view of a porous metal panel made in accordance with the principles of the present invention.

DESCRIPTION OF THE PREFERRED EMBODIMENT

Referring now to the drawing, and in particular to FIG. 1, wherein is shown an illustrative embodiment of the invention, the numeral 10 generally designates a porous metal panel made in accordance with the principles of the present invention. The numeral 11 generally designates the outer skin of an airplane wing. In the illustrative embodiment of FIG 1, the metal panel 10 is thus shown as being shaped to form the leading edge of an airplane wing. However, it will be understood that a metal panel made in accordance with the principles of the present invention may be used to form a part of other types of surfaces which require protection against the formation of ice.

The illustrative porous metal panel of FIG. 1 includes a porous outer metal plate or skin 12 which is preferably made from stainless steel and of a thickness commensurate with the outer skin 11 of an airplane wing. The porous outer plate 12 is of a conventional type of porous metal which is readily available on the market. The porosity of the porous outer plate 12 would be about a 40 micron porosity. The porous outer metal plate 12 is made in a conventional manner by laminating a plurality of layers of stainless steel wire mesh together in a plywood-type construction, and making it as thick as required for the particular job in which the plate 12 is to be used.

The numeral 13 in FIG. 1 designates a porous metal membrane having a porosity finer than the porosity of the porous outer plate 12. The nature of the deicing fluid used would dictate the micron porosity of the membrane 13. For example, a 2 micron porosity membrane would be used if the deicing fluid used was of a standard deicing fluid available on the market and sold by the Kilfrost Company of England under product number R328. The last mentioned standard deicing fluid comprises 85 percent glycol, 5 percent isopropyl alcohol and 10 percent distilled water.

As shown in FIG. 1, the porous metal panel of the present invention includes an inner or backplate 15 spaced inwardly apart from the membrane 13 by a separator member 14. The separator member 14 comprises a sheet of metal wire mesh which has a porosity coarser than the porosity of the porous metal membrane 13.

It will be understood that the porous metal panel of the present invention may be made to any shape desired in accordance with the surface with which it is to be incorporated. FIG. 7 schematically illustrates a rectangular type of porous metal panel which is first formed flat as illustrated in FIG. 2 and which is then shaped in accordance with the leading edge of the airplane wing surface 11 of FIG. 1.

In forming the porous metal panel 10 of FIG. 1, it is preferable to first bond the metal membrane 13 to the outer plate 12 by heat and pressure, as is generally done in the well-known sintering process. As illustrated in FIG. 4, the outer plate 12 would be mounted in a flat position on a suitable lower stationary platen 18, and the metal membrane 13 would be disposed on the inner surface of the plate 12. A second movable platen 19 would be brought into contact with the membrane 13 and the outer plate 12, and then by heat and pressure bond these two components together. The parts 12 and 13 and the platens 18 and 19 are brought up to a temperature corresponding to the temperature necessary to bring the material of the parts 12 and 13 to the plastic state. For example, in a 300 series stainless steel as is used in aircraft work, the temperature would be about 1,900° F. The pressure necessary to bond the parts 12 and 13 together when they are brought to the plastic state would depend upon the size of the parts, and normally the mere application of gravity weight is sufficient to bond these parts together. It should be understood that the principles of sintering metal parts together in this manner is well known. It should also be understood that the bonding together by heat and pressure is normally carried out in a vacuum or an inert gas atmosphere so that oxidation does not occur, and such procedure is well known in the art of sintering.

After the outer plate 12 and the membrane 13 have been bonded together, they are laid on the upper surface of another platen 20. The coarse metal mesh separator member 14 is laid over the membrane 13 and the inner plate 15 is laid over the separator member 14. It will be understood that a plurality of nipples 17 are welded to the backplate 15 to permit pressurized deicing fluid to be admitted into the chamber 22.

As shown in FIG. 2, a second movable platen 21 is placed against the nonporous inner metal plate with appropriate recesses to receive the nipples 17, the inner plate 15 and the separator member 14, and bond the various components of the panel together by heat and pressure. As shown in FIG. 2, the peripheral edges 16 of the inner plate 15 are bonded by heat and pressure to the peripheral edges of the membrane 13 and to the outer plate 12. The appropriate heat and pressure are used in accordance with the well-known sintering process, as explained hereinbefore, under the discussion of the subassembly of the membrane 13 to the outer plate 12.

In FIG. 2, the heat and pressure provided by the heated platens 20 and 21 bond the peripheral edges 16 of the inner plate 15 and the membrane 13 to the outer plate 12. However, for cases where the panel of the present invention is to be used as a load-bearing structure, said peripheral edges may be further fastened together by being electron beam welded, as indicated by the numeral 23 in FIG. 5.

It will be understood that the panel of the present invention may be shaped as desired by any well-known method and apparatus. FIG. 6 schematically illustrates one method that may be used in shaping the panel 10 to a particular form, for example, the curved front end of an airplane wing. In FIG. 6, the numeral 24 generally designates a male platen over which may be bent a panel 10 by means of a conventional fluid expandable rubber mat 25 held in a suitable housing 26.

In use, the nipples 17 are connected in any suitable manner to a source of pressurized deicing fluid. When the pump in the fluid source system is not operating and not exerting a force on the system, the fluid will not flow through the membrane 13 since it functions to block the fluid when the fluid is not under pressure. When the pump is turned on, sufficient pressure is built up to then force the fluid through the membrane 13 and out through the porous plate 12 onto the leading edge of the surface 11 where it will serve to remove or eliminate ice accretion. The amount of fluid passing through the membrane 13 depends upon the desired flow commensurate with the porosity selected for the membrane 13, relative to the fluid used, as described hereinbefore.

It will be seen that the porous metal panel of the present invention has the advantages of needing no fasteners, it has a continuous seal around the periphery, and accordingly, no separate seals are employed and fewer parts are required than heretofore used in the prior art panels.

The method for making the panel of the present invention is more economical than the method required for making the prior art panels, because there is less labor involved in handling the fewer parts required for assembling the panel and in positioning the necessary tools involved in holding the various panel components and bonding them together. The panel of the present invention is provided with a continuous joint between the members thereof, whereas the prior art panel employing rivets only allowed intermittent connections. The bonding by heat and pressure of the various panel components throughout the entire area thereof provides a solid pack construction which is an advantage over the prior art constructions in that it provides a stronger, integral panel. It will be understood that stainless steel is preferably employed for the panel components 12, 13 and 14 and 15.

While it will be apparent that the preferred embodiments of the invention herein disclosed are well calculated to fulfill the objects above stated, it will be appreciated that the invention is susceptible to modification, variation and change.

What is claimed is:

1. A porous metal panel, for attachment to a surface to form part of said surface, for distributing deicing fluid onto said surface comprising:
 a. a porous outer metal plate;
 b. a nonporous inner metal plate;
 c. a porous metal membrane, having a porosity finer than the porosity of said porous outer plate, disposed on the inner surface of said porous outer plate;
 d. a separator member comprising a sheet of metal wire mesh disposed between said metal membrane and said nonporous metal plate, and said separator member having a porosity coarser than the porosity of said porous metal membrane;
 e. the entire peripheral edges of said inner plate and membrane being bonded in a fluidtight condition to the outer plate to enclose said separator member and form a fluid chamber; and,
 f. means for connecting said fluid chamber to a source of pressurized deicing fluid for admission of said fluid into said chamber for distribution through said membrane and outer porous plate onto said surface.

2. A porous metal panel as defined in claim 1, wherein:
 a. the porosity of said membrane is of such a micron rating relative to said fluid so as to block flow of said fluid through said membrane when pressure on said fluid is cut off.

3. A porous metal panel as defined in claim 1, wherein:
 a. said metal outer plate, said metal membrane, said metal wire mesh separator and said metal inner plate are each made from stainless steel.

4. A porous metal panel as defined in claim 1, wherein:
 a. said peripheral edges of said inner plate and membrane are bonded to said outer plate by heat and pressure.

5. A porous metal panel as defined in claim 4, wherein:
 a. said metal outer plate, said metal membrane, said metal wire mesh separator and said metal inner plate are bonded together by heat and pressure to form a solid pack construction.

6. A porous metal panel as defined in claim 1, wherein:
 a. said peripheral edges of said inner plate and membrane are bonded to said outer plate by being electron beam welded together.

7. A porous metal panel as defined in claim 6, wherein:
 a. said metal outer plate, said metal membrane, said metal wire mesh separator and said metal inner plate are bonded together by heat and pressure to form a solid pack construction.

UNITED STATES PATENT OFFICE
CERTIFICATE OF CORRECTION

Patent No. 3,614,038  Dated October 19, 1971

Inventor(s) Gerald L. Nichols

It is certified that error appears in the above-identified patent and that said Letters Patent are hereby corrected as shown below:

Column 2, line 56, between "percent" and "glycol" insert -- ethylene --.

Signed and sealed this 14th day of March 1972.

(SEAL)
Attest:

EDWARD M. FLETCHER, JR
Attesting Officer

ROBERT GOTTSCHALK
Commissioner of Patents